UNITED STATES PATENT OFFICE.

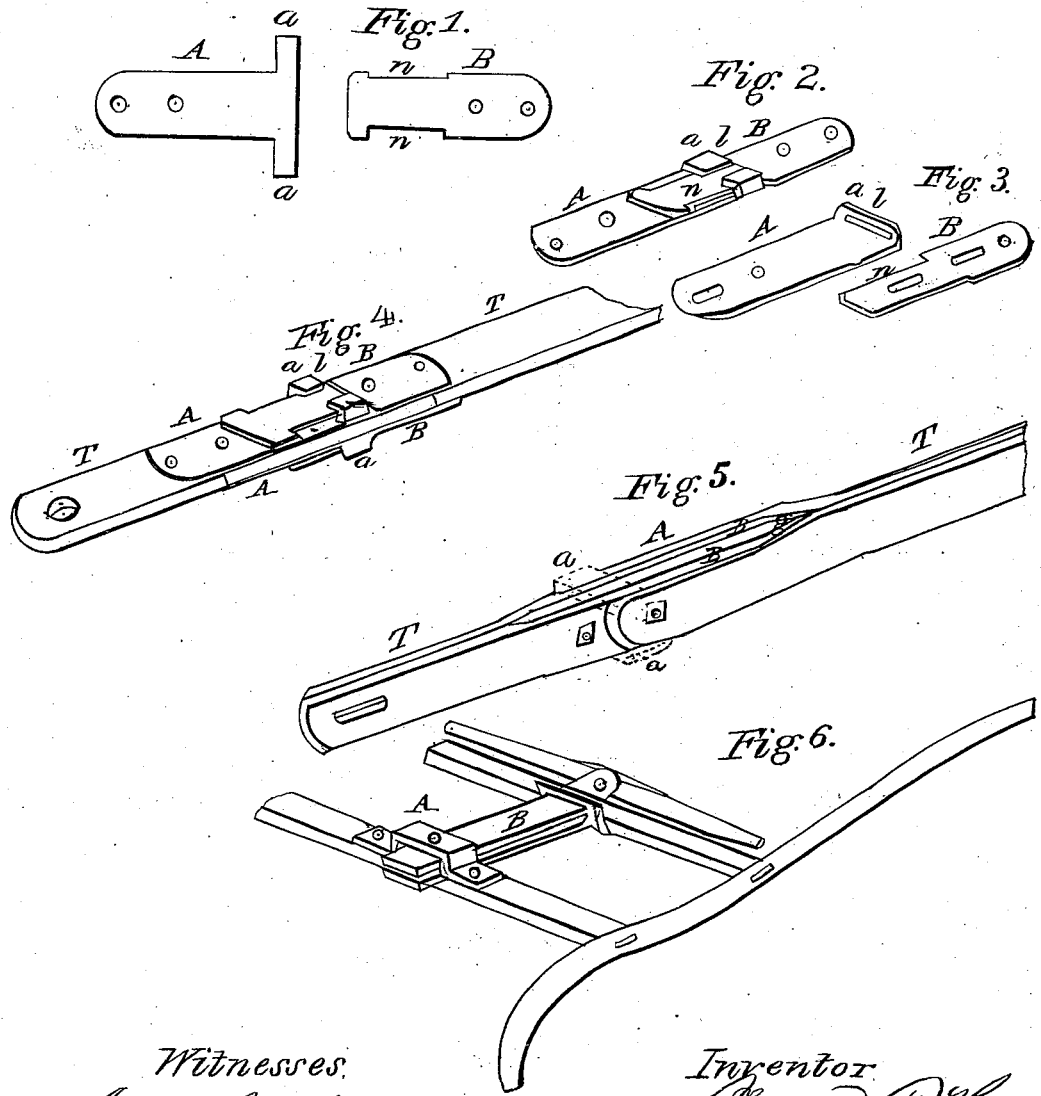

FRANCIS P. HART, OF STRASBURG, PENNSYLVANIA, ASSIGNOR TO HIMSELF AND SAMUEL KENEAGY, OF SAME PLACE.

Letters Patent No. 85,307, dated December 29, 1868.

IMPROVEMENT IN BREAKING THE SURGE ON HARNESS OR VEHICLES.

The Schedule referred to in these Letters Patent and making part of the same.

*To all whom it may concern:*

Be it known that I, FRANCIS P. HART, of Strasburg, in the county of Lancaster, and State of Pennsylvania, have invented a new and improved Mode for Breaking the Surge on Harness or Vehicles by means of India rubber, applied between metallic or leather bands, to traces or the single-tree of vehicles; and I do hereby declare that the following is a full and exact description thereof, reference being had to the accompanying drawings, making a part of this specification, in which—

Figure 1 shows one pair of metallic plates A B, the ears $a$ of A (not bent in) to form the open sliding loop $l$ for the narrowed portion $n$ of plate B.

Figure 2 shows a pair of said plates united.

Figure 3 shows a modification of the same detached.

Figure 4 shows a pair of plates, A and B, connected with the leather or trace T, with the gum-elastic G, between the upper and lower pair of plates.

Figure 5 illustrates my first arrangement with the gum-elastic G between the leather straps forming the trace.

Figure 6 shows the same device attached to the shaft and single-tree or whiffle-tree.

The nature of my invention consists in securing a stout strap of India rubber to traces or vehicles, in such a manner as to break the surge, and the effect of sudden jolts or jerks so apt to chafe the horse and incommode the occupant of the vehicle.

To enable others skilled in the art to make and use my invention, I will more fully explain the several illustrations.

Two plates of metal, A and B, are connected by headed bolts, on the upper and lower sides of the trace T, fig. 4, to the end cut off square, having a stout piece of gum-elastic G, of the width and thickness of the trace, interposed between the ends of the traces and the upper and lower plates, which plates are also riveted to said gum G, the plate B sliding in the slot or keepers $a$ on plate A, thus allowing the gum to yield to the extent of the sliding portion $n$ on plate B. Slots may also be made in the plates, for certain purposes, to adapt the bolt to the yielding gum. A leather keeper may be put around the plates to protect them.

Fig. 5 illustrates the same principle as first tried, by inserting the gum between the double straps forming the trace, by bolting or sewing the gum in such a manner as to yield in slots, (when bolts are used,) as shown.

Fig. 6 illustrates the mode of forming the plates and gum to the shafts and whiffle-tree, instead of affixing the same to each trace for the purpose of breaking the sudden jar or surge, and in order to prevent the breaking of the traces or single-tree, and to ease the animal's shoulders, and protect it against chafing, as well as to promote the ease and comfort of the passengers by attaching the gum substantially in the manner specified.

I am aware that E. Mahon, in his patent, December 4, 1861, employs elastic in combination with fibrous materials for manufacturing traces; but such I do not claim.

I do not claim the application of gum-elastic to bridles, saddles, nor to the draught or breast-strap on harness, arranged with elastic thongs and spiral springs, being too complicated.

My application consists in the use of a stout single piece of flat gutta-percha on the ends of the trace, near the single-tree, as shown. Therefore,

What I claim as my invention, and desire to secure by Letters Patent, is—

The application of a flat piece of gum-elastic G introduced between plates or straps A B T, when constructed, substantially in the manner shown and described, for the purpose specified.

Witnesses:            FRANCIS P. HART.
  ISAAC WALKER,
  MARTIN H. FOULK.